United States Patent
Bailey et al.

(10) Patent No.: US 7,257,776 B2
(45) Date of Patent: Aug. 14, 2007

(54) SYSTEMS AND METHODS FOR SCALING A GRAPHICAL USER INTERFACE ACCORDING TO DISPLAY DIMENSIONS AND USING A TIERED SIZING SCHEMA TO DEFINE DISPLAY OBJECTS

(75) Inventors: Richard St. Clair Bailey, Bellevue, WA (US); Stephen Russell Falcon, Woodinville, WA (US); Dan Banay, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 286 days.

(21) Appl. No.: 10/072,393

(22) Filed: Feb. 5, 2002

(65) Prior Publication Data

US 2003/0146934 A1 Aug. 7, 2003

(51) Int. Cl.
*G06F 3/00* (2006.01)
(52) U.S. Cl. .................. 715/788; 715/517; 715/521; 715/800; 715/801; 715/815
(58) Field of Classification Search ............... 715/521, 715/517, 788, 800, 801, 815
See application file for complete search history.

(56) References Cited

U.S. PATENT DOCUMENTS

| | | | |
|---|---|---|---|
| 5,001,697 A * | 3/1991 | Torres | ............... 715/542 |
| 5,748,974 A | 5/1998 | Johnson | |
| 5,796,401 A * | 8/1998 | Winer | ............... 345/619 |
| 5,797,123 A | 8/1998 | Chou et al. | |
| 5,838,969 A | 11/1998 | Jacklin et al. | |
| 5,842,165 A | 11/1998 | Raman et al. | |
| 5,854,629 A | 12/1998 | Redpath | |
| 6,061,653 A | 5/2000 | Fisher et al. | |
| 6,081,816 A * | 6/2000 | Agrawal | ............... 715/521 |
| 6,125,347 A | 9/2000 | Cote et al. | |
| 6,192,339 B1 | 2/2001 | Cox | |
| 6,233,559 B1 | 5/2001 | Balakrishnan | |
| 6,310,629 B1 | 10/2001 | Muthusamy et al. | |
| 6,434,529 B1 | 8/2002 | Walker et al. | |
| 6,456,305 B1 * | 9/2002 | Qureshi et al. | ............. 715/800 |
| 6,456,974 B1 | 9/2002 | Baker et al. | |

(Continued)

OTHER PUBLICATIONS

"Winamp 3 Preview".http://www.mp3newswire.net/stories/2001/winamp3.htm. May 23, 2001.

(Continued)

*Primary Examiner*—Tadesse Hailu
*Assistant Examiner*—Michael Roswell
(74) *Attorney, Agent, or Firm*—Lee & Hayes PLLC

(57) ABSTRACT

Systems and methods are described for scaling a graphical user interface (GUI) to fit proportionally in displays of different sizes. Bounds of display objects to be displayed in the graphical user interface are defined in terms of position relative to horizontal and vertical dimensions of a display on which the GUI is rendered. An application defines the GUI in relative terms, but an end user may alter the look and feel of controls in the GUI. A tiered sizing schema is described that provides size constraints for display objects. The end user is limited as to how much a size of a display object can be altered in order to preserve the integrity of the original specifications of the GUI when the GUI is displayed on displays of various dimensions.

14 Claims, 6 Drawing Sheets

U.S. PATENT DOCUMENTS

| | | |
|---|---|---|
| 6,463,413 B1 | 10/2002 | Applebaum et al. |
| 6,469,711 B2 | 10/2002 | Foreman et al. |
| 6,507,817 B1 | 1/2003 | Wolfe et al. |
| 6,701,383 B1 | 3/2004 | Wason et al. |
| 6,785,654 B2 | 8/2004 | Cyr et al. |
| 6,993,508 B1 | 1/2006 | Major et al. |
| 2002/0024539 A1 | 2/2002 | Eleftheriadis et al. |
| 2002/0095290 A1 | 7/2002 | Kahn et al. |
| 2003/0050777 A1 | 3/2003 | Walker, Jr. |

OTHER PUBLICATIONS http://en,; "Skin (computing)". http://en.wikipedia.org/wiki/Skin_%28computing%29. Wikipedia entry.

"Winamp.com Skins". http://www.winamp.com/skins. (Various selections).

"Winamp2: Winamp's Subwindows".http://www.winamp-faq.de/english/wa2/documentation/sub.htm.2000 DigiTalk.

"Java Speech API Programmer's Guide", Version 1.0, Oct. 1998.

"Java Speech API Specifications", Version 1.0, 1997-1998.

\* cited by examiner

400 — SCHEMA Tiered Sizing

402 — Large Object = (15%, 30%)

404 — Medium Object = (10%, 20%)

406 — Small Object = (5%, 10%)

Text Box As Programmed
500

Text Box - Font Enlarged Too Much
502

Text Box - Smaller Resolution; Small Font
504

Text Box - Smaller Resolution; Proportional Font
506

SYSTEMS AND METHODS FOR SCALING A GRAPHICAL USER INTERFACE ACCORDING TO DISPLAY DIMENSIONS AND USING A TIERED SIZING SCHEMA TO DEFINE DISPLAY OBJECTS

TECHNICAL FIELD

The systems and methods described herein relate to graphical user interfaces. More particularly, the described invention relates to systems and methods for scaling a graphical user interface so that the graphical user interface is not distorted when rendered on different displays.

BACKGROUND

The proliferation of personal computing devices, computing appliances, automobile computers and the like has increased the number of computer platforms that are available to consumers. The different computer platforms typically have different hardware specifications, such as the size of a display included in the platforms. The increase in types of computer platforms has presented a problem to software application developers who develop applications for the different platforms.

For example, the use of automobile computers that provide a graphical user interface (GUI) to a user are becoming common. But automobile manufacturers typically desire to have a unique look to their automobiles, so a standard look and feel to a GUI is not desirable in this instance. As a result, a software application written for one make of automobile will not provide acceptable results on another make of automobile.

Ideally, an application developer could develop one software application that could run on multiple different platforms. However, if the different platforms include different hardware, modifications may have to be made to an application for each platform. For example, suppose a developer writes a software application to run on a platform having a display resolution of 640 pixels×300 pixels. If the application is run on a platform that has a 320×240 display resolution, then visual components written for the higher resolution display will appear cropped on the lower resolution display. Furthermore, displaying a bitmap written for a display of one size on a display of another size produces artifacts in the bitmap display, which renders doing so unacceptable.

FIGS. 1a and 1b exemplify the problem discussed above. FIG. 1a is a diagram of a first display 100 of a first size and FIG. 1b is a diagram of a second display 120 of a second size. The first display 100 includes a title bar 102, a client area 104 and a system tray 106. The second display 120 includes a title bar 122, a client area 124 and a system tray 106. In such a configuration, a graphical user interface is limited to the client area 104, 124 of each display 100, 120.

For purposes of the present discussion, the first display 100 is assumed to have a display aspect ratio of 320 pixels by 240 pixels (horizontal×vertical). The second display 120 is assumed to have a display aspect ratio of 640×300 pixels. Accordingly, the second display 120 has a greater resolution than the first display 100. Also, when a GUI displayed according to pixels on the first display 100 is displayed according to pixels on the second display 120, the GUI will be distorted and will have an undesirable appearance due to disproportional shrinking of the GUI.

This is because display objects are programmed for display on the first display 100 according to pixel size, or some other fixed measurement unit. A rectangular display object 150 is shown, for example, that is defined to be 100 pixels horizontally and 25 pixels vertically. The display object 150, therefore, measures 100×25 on both the first display 100 and the second display. While the rectangle 150 that results on the first display 100 has a length of about one-third of the first display 100, the rectangle 150 has a length of less than one-sixth of the display when displayed on the second display 120. Furthermore, the height of the rectangle 150 on the first display 100 would be about one-tenth of the first display 100, while the height of the rectangle 150 would be about one-twelfth of the display when rendered on the second display 120. Clearly, the same rectangle object 150 appears disproportionate to the client area 124 when rendered on the second display 120.

If a developer were provided a way in which to write an application that could scale its GUI to fit proportionally on different sizes of displays, then the developer would be able to write one application that would operate on a number of different platforms.

SUMMARY

Systems and methods are described for scaling a graphical user interface so that the graphical user interface appears proportionally correct regardless of the resolution of the display on which the graphical user interface is rendered. The systems and methods utilize proportional scaling to provide rich graphic environments and high graphic fidelity. A tiered sizing schema is also described that defines size constraints for display objects, thus ensuring fidelity of a graphical user interface when displayed on a target display.

Proportional scaling is fundamental to the described invention. For example, a control object provided on a graphical user interface (GUI) is not described in terms of pixels or any other standard method of defining bounds of graphic display objects. In the present invention, such a display object is defined by defining bounds of the display object relative to margins of the display. For example, an upper left bound of a display object may be defined as being one-third of a display width from a left margin of the display and one-half of a height from a top margin of the display. A lower right bound may be similarly defined.

In one implementation, a schema defines size constraints for display objects. Any number of sizes may be defined in the schema and applications adhering to the schema will have display objects that are limited to the sizes in the schema. For example, a schema may define three sizes for display objects, such as a "small", "medium" and "large". This feature protects against display objects being distorted when displayed in a different resolution that that which they were designed. As a result, applications using a graphical user interface designed on a system having one resolution will look true to its design specifications when displayed on an original equipment manufacturer (OEM) display having a different resolution.

Another problem with scaling a GUI is that fonts may be scaled down to a size that is illegible, or scaled up to a size so large that complete words cannot be displayed. To overcome this problem, one implementation defines a minimum number of characters that must be displayed in a particular area measured as a fraction of display size. Doing so prevents an OEM from using a font that is larger than a GUI can handle. It also prevents the software from shrinking a font desired by an OEM to a size that is illegible or otherwise unacceptable to the OEM.

BRIEF DESCRIPTION OF THE DRAWINGS

A more complete understanding of exemplary methods and arrangements of the present invention may be had by reference to the following detailed description when taken in conjunction with the accompanying drawings wherein:

FIG. 3a is a diagram of a graphical user interface for the client area shown in FIG. 1a.

DETAILED DESCRIPTION

Figure 1A:
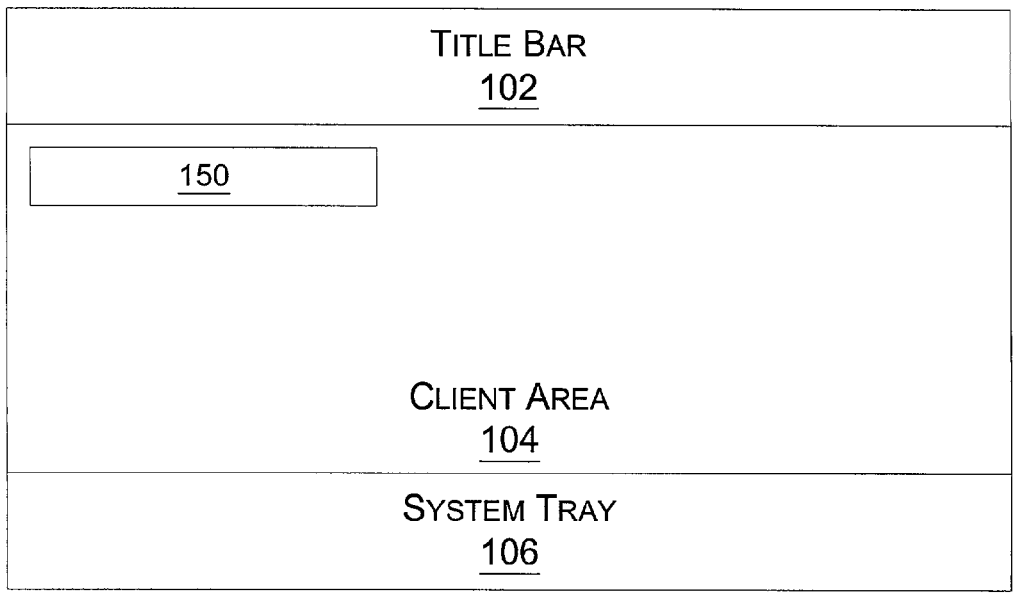
FIG. 1a is a diagram of a display of a first size.

This invention concerns a computer operating system that runs applications that provide a graphical user interface (GUI) on a display. Applications may be written for the operating system that define GUI display objects according to a fraction of the display on which the GUI is rendered. The present invention is described according to an example of an automobile computer system having a display. However, it is noted that the features described herein may be applied to any application that has a graphical user interface that may be displayed on different sizes of displays.

Computer-Executable Instructions/Modules

The invention is illustrated in the drawings as being implemented in a suitable computing environment. Although not required, the invention is described in the general context of computer-executable instructions, such as program modules, to be executed by a computing device, such as a personal computer or a hand-held computer or electronic device. Generally, program modules include routines, programs, objects, components, data structures, etc., that perform particular tasks or implement particular abstract data types. Moreover, those skilled in the art will appreciate that the invention may be practiced with other computer system configurations, including multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Exemplary Scaling System

Figure 2:
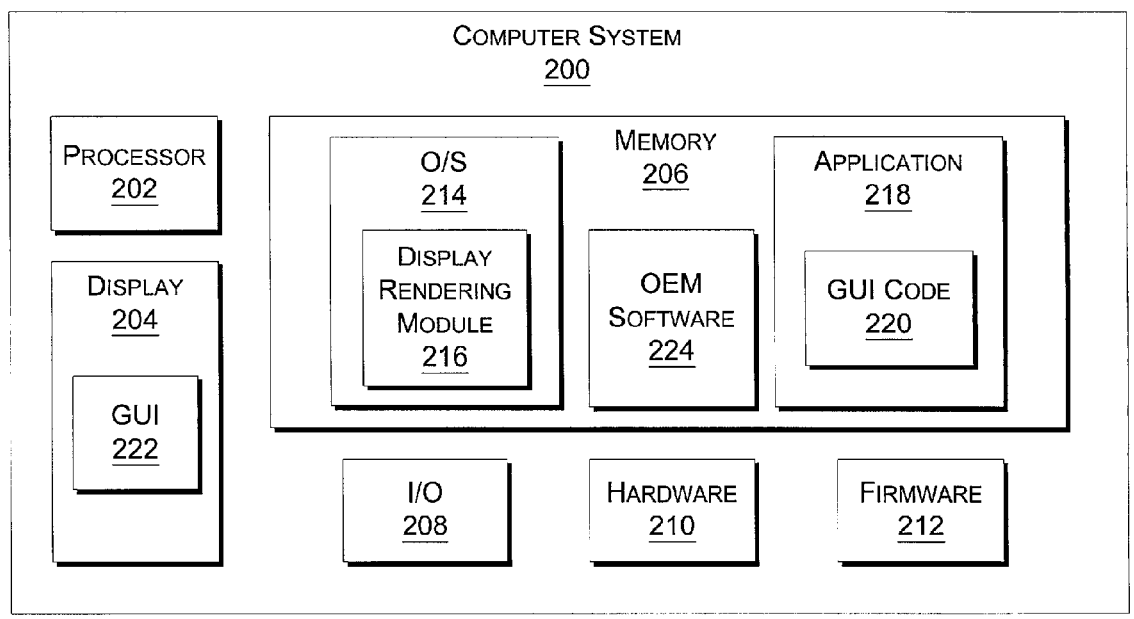
FIG. 2 is a block diagram of a computer system conforming to the invention described herein.

FIG. 2 is a block diagram of a computer system 200 conforming to the invention described herein. The computer system 200 includes a processor 202, a display 204 and memory 206. The computer system 200 also includes an input/output (I/O) unit 208 that may include hardware, software or a combination of the two. The I/O unit 208 allows a user to input data into the computer system 200, and allows the computer system 200 to output data to a user. The I/O unit 208 may comprise more than one component, such as a keypad, a microphone, a speaker, and the like.

The computer system 200 also includes hardware 210 and firmware 212. The hardware 212 includes any system-specific hardware that may be necessary for the computer system 200 to function in a particular manner. The firmware 212 is software that is executable on the processor 202, the software enabling the hardware 212 to operate properly on the computer system 200.

The memory 206 of the computer system 200 stores an operating system 214 that includes, among other modules (not shown) typically found in an operating system, a display rendering module 216 that receives code for displaying objects according to a size aspect ratio of the display 204. The memory 206 also stores a software application 218 that includes graphical user interface (GUI) code 220 that, when executed, displays a GUI 222 on the display 204.

Original equipment manufacturer (OEM) software 224 may also be stored in the memory 206. The OEM software 224 provides the visual appearance of objects on the GUI 222. The OEM software 224 may include code modules that modify the GUI code 220 before the GUI 222 is rendered on the display 204. If so, then there are three components that take part in rendering the GUI 220: the application 218, the display rendering module 216 and the OEM software 224. The application 218 defines the GUI 222 in the GUI code 220; the display rendering module 216 renders the GUI 222 on the display 204 according to instructions received from the application 218; and the OEM software 224 may modify the final appearance of the GUI 222 as it is displayed.

Figure 1B:
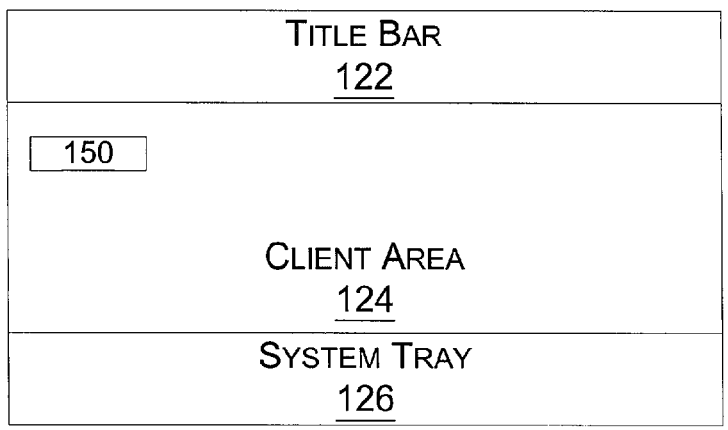
FIG. 1b is a diagram of a display of a second size.
Figure 3A:
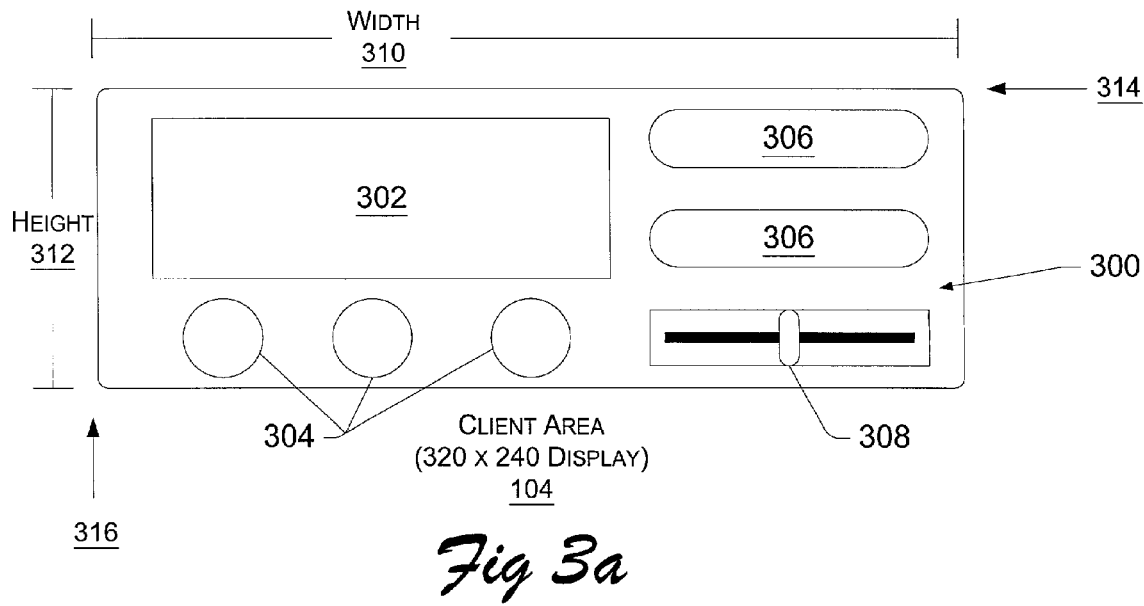
Figure 3B:
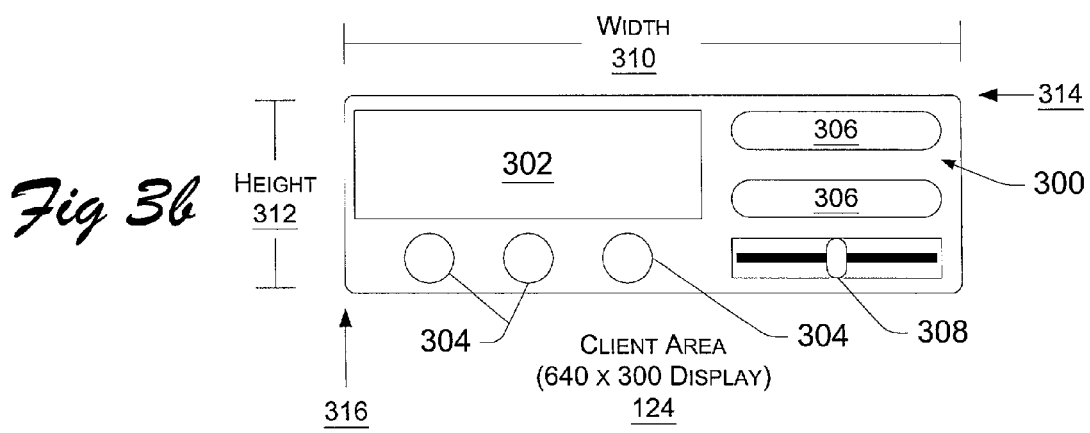
FIG. 3b is a diagram of a graphical user interface for the client area shown in FIG. 1b.

FIG. 3a is a diagram of a graphical user interface 300 in the client area 104 of the first display 100 (from FIG. 1a) that is a first size, and FIG. 3b is a diagram of the graphical user interface 300 displayed in the client area 124 on the second display 2102 (from FIG. 1b) that is a second size. The graphical user interface 300 is proportional to a display aspect ratio of the respective displays 104, 124. This is the desired result of the present invention.

The graphical user interface 300 includes an image 302, control buttons 304 (3), control bars 306 (2) and a horizontal slider control 308. The controls are merely exemplary, but the GUI 300 may include any practical number of controls. Furthermore, other types of controls may be displayed on the GUI 300.

The client area 104, 124 has a height 310, a width 312, a top edge 314 and a left edge 316. The size and location of the controls are expressed in terms of a fraction of the width 312 from the left edge 316 and a fraction of the height 310 from the top edge 314. Although the controls are defined according to the top edge 314 and the left edge 316 of the client area 104, 124, it is noted that the controls could be defined relative to any other known point along the width 312 and/or the height 310.

Figure 3C:
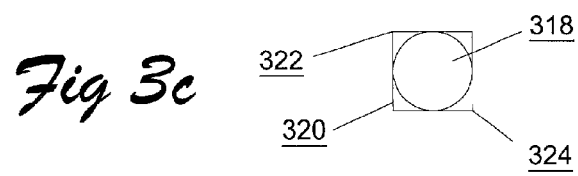
FIG. 3c is a diagram of a display control having a bounded area.

FIG. 3c is a representation of a display control 318 having a bounded area 320 defined by an upper left bound 322 and a lower right bound 324. Further discussion of display controls will refer to a display control having an upper left bound and a lower right bound. Although the upper left bound and the lower left bound is not explicitly shown for each display object, it is to be understood that each display control has an upper left bound and a lower right bound as shown in FIG. 3c.

To create the desired results of proportionality, the display rendering module 216 is configured to display the GUI 222 according to instructions received from the application 218. The GUI code 220 contained in the application 218 defines the bounds of display objects displayed on the GUI 300 in terms of a fraction of display height and width.

For example, the GUI code 220 may define a size and location of a control bar 306 as having an upper left bound 322 of (5%, 60%) and a lower right bound 324 of (10%, 95%). This means that the upper left bound 322 is located a distance of 5% of the height 312 from the top edge 314, and a distance of 60% of the width 310 from the left edge 316. This also signifies that the lower right bound 324 is located a distance of 10% of the height 312 from the top edge 314, and a distance of 95% of the width 310 from the left edge 316. The size and location of the display control 306 may be determined from these bounds.

Any coordinate system may be used to determine the location of the bounds of a display object, such as a traditional (x, y) coordinate system. Furthermore, the bounds do not have to be represented in percentages as described above. Any fractional representation of display object bounds will suffice for the purposes described herein.

It should be noted that the upper left bound 322 and the lower right bound 324 are display unit independent. The display rendering module 216 is configured to determine the size of the display, determine the fraction, i.e., percentage, specified in the GUI code 220, and render the control bar 306 accordingly. If the display is defined in pixels, for example, the display rendering module 216 produces a result that is defined in pixels. The client area 124 of the display has a horizontal resolution of 640 pixels by 300 pixels. The upper left bound 322 of the control bar 306 defined above would result in a location that is 15 pixels from the top edge 314 and 384 pixels from the left edge 316. The lower right bound 324 of the control bar 306 would result in a location that is 30 pixels from the top edge 314 and 608 pixels from the left edge 316. In an event that a non-integer number of display units results, the result of calculating the upper left bound 322 and the lower right bound 324 are rounded to the nearest whole display unit.

In some cases (as discussed in U.S. patent application Ser. No. 09/603,846, filed Jun. 26, 2000 by Richard St. Clare Bailey and assigned to MICROSOFT CORP., said application incorporated by reference herein), an OEM may provide the look of the controls to be used in a particular environment. For example, if General Motors Co. installs computers in GM automobiles, it may want the controls to include a GM logo to better define a unique look for GM cars. In such an instance, the OEM (e.g., GM) and the application developer should develop some sort of understanding between them as to size constraints of display objects. Conforming to such an understanding assures that the specifications of the GUI written by the developer will be preserved in the OEM's display space.

Figures 4A, 4B:
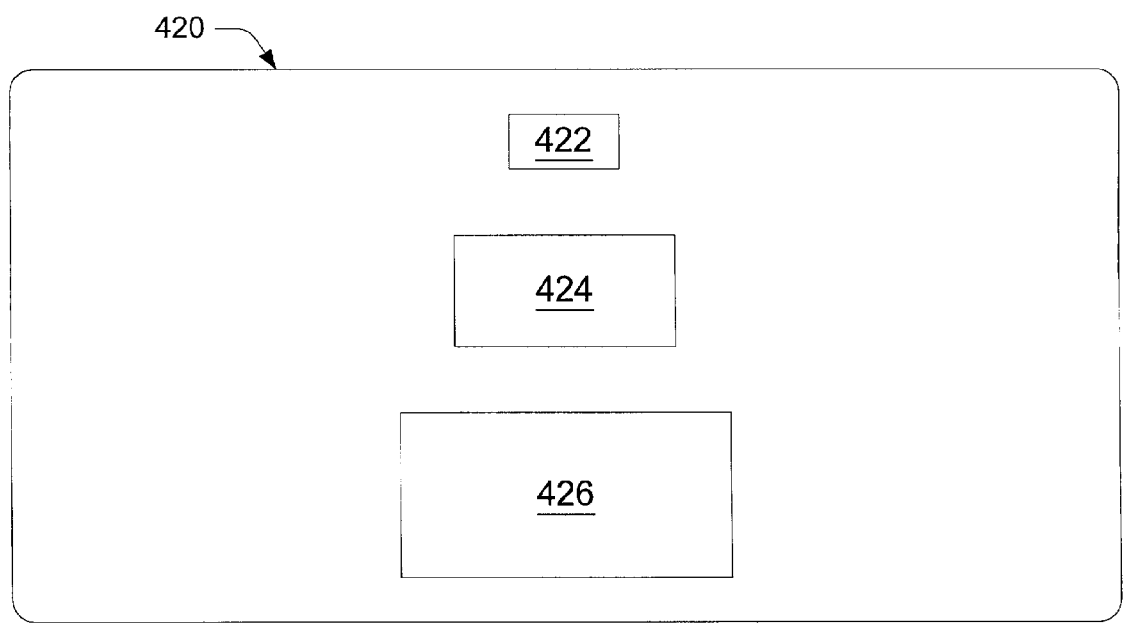
FIG. 4a is a representation of a tiered sizing schema.
FIG. 4b is a block diagram of a graphical user interface utilizing the tiered sizing schema.

Such an understanding may be achieved by establishing a schema of tiered sizing for display objects. FIG. 4a is a representation of a tiered sizing schema 400 that defines standard sizes of display objects. The schema 400 defines a large object 402 as being (15%, 30%), i.e., 15% of the height of the display from the top edge of the display, and 30% of the width of the display from the left edge of the display.

Similarly, the schema 400 defines a medium object 404 as being (10%, 20%), and a small object 406 as being (5%, 10%). It is noted that the schema 400 may define the height and the width of the objects in separate entries, as well as together.

FIG. 4b is a diagram of a display 420 having three sizes of objects, in accordance with the schema 400 described in FIG. 4a. The display 420 shows a small display object 422, a medium display object 424 and a large display object 426. When a GUI is designed, display objects may be defined and placed on a form. For example, a designer may click on an icon associated with a medium display object to create a display object for the GUI. That object will be sized automatically according to the schema 400.

Use of the schema 400 allows an OEM to design visual aspects of display objects with regard to the sizes defined by the schema 400. Since the OEM knows that a medium object is a certain fraction of a size of a display used in an OEM system, the OEM can design graphics, such as bitmaps, that conform to the size of display objects on the particular system to provide a rich visual interface.

Another problem that may result is if an OEM customizes, i.e., resizes, controls that include text of a certain font. Expanding a font may result in only a part of a word being displayed on the GUI. On the other hand, shrinking a font may result in a word being displayed too small for a person to read easily.

Figure 5A:
FIG. 5a is an illustration of a text box in a graphical user interface.

FIGS. 5a–5d are illustrations of a text box 500 in a graphical user interface. FIG. 5a is an illustration of a text box as it is programmed in the GUI code 220 for the graphical user interface 222. The text box 500 is shown on a display with the word "HELLO" displayed within its borders.

Figure 5B:
FIG. 5b is an illustration of a text box in a graphical user interface.

FIG. 5b is an illustration of a text box 502 in the graphical user interface 222 that is displayed on a different sized display than the one on which the text box 500 shown in FIG. 5a is displayed. In this case, the computer system 200, i.e., the OEM, has increased the size of the font used for the text box 502. The proportions of the text box 502 itself are limited by the proportions of the display on which it is rendered. As a result, all of the letters cannot fit in the text box 502 at the desired fonts and the entire word is not displayed. The result is unacceptable.

To prevent this from happening, an OEM must be aware of limits on increasing font size for displays. One way to do this is to require that a certain amount of linear text space be provided in the text box 502. For example, the GUI code 220 may require that the text box 502 display a minimum of n character spaces. Then, an OEM cannot expand the font too much to display entire words in the display objects.

Figure 5C:
FIG. 5c is an illustration of a text box in a graphical user interface.

FIG. 5c is an illustration of a text box 506 in the graphical user interface. 222 that is displayed on a different sized display than the one on which the text box 500 or the text box 502 is displayed. In this case, the OEM has decreased the size of the font used for the text box 504. The problem is that the font is too small to be legible after the text box 504 has been proportionally decreased in size. The result is also unacceptable.

To prevent this situation from occurring, the GUI code 220 requires the display font to be a predetermined size, for example, 14 point. The predetermined size is the smallest font size that a developer of the application 218 deems practical to use for the GUI 222.

Figure 5D:
FIG. 5d is an illustration of a text box in a graphical user interface.

FIG. 5d is an illustration of a text box 506 in a graphical user interface. 222 that is displayed on a smaller sized display than the text box 500 shown in FIG. 5a. In this case, the size of the text box 506 has been reduced. However, the font size is constrained so that it cannot be too big or too small for the text box 506. As a result, the final rendering is visually acceptable.

Exemplary Computer Environment

Figure 6:
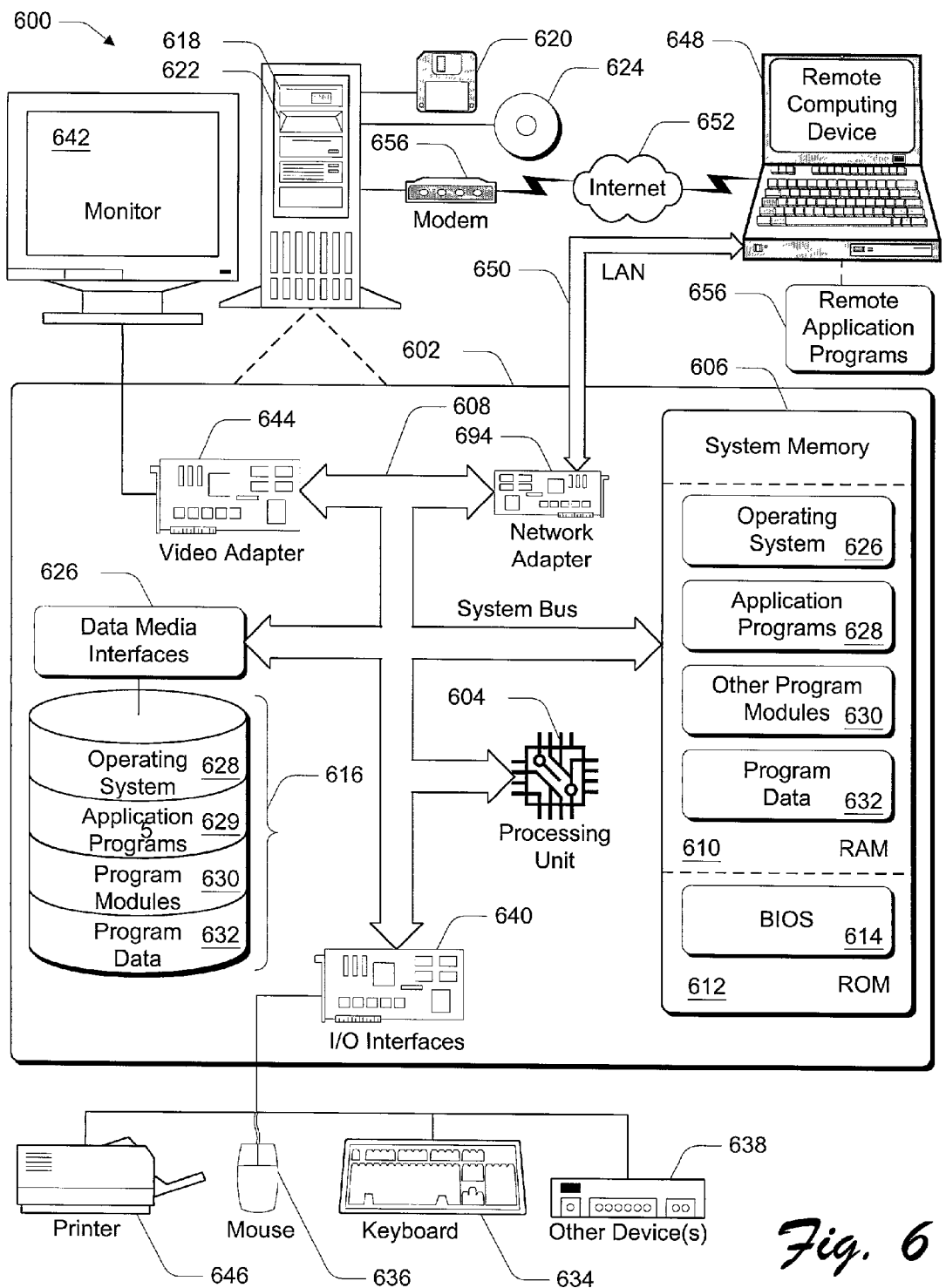
FIG. 6 is a diagram of an exemplary system on which the present invention may be implemented.

The various components and functionality described herein are implemented with a number of individual computers. FIG. 6 shows components of typical example of such a computer, referred by to reference numeral 600. The components shown in FIG. 6 are only examples, and are not intended to suggest any limitation as to the scope of the functionality of the invention; the invention is not necessarily dependent on the features shown in FIG. 6.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc., that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 6, the components of computer 600 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 600 typically includes a variety of computer-readable media. Computer-readable media can be any available media that can be accessed by computer 600 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 600, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 600 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface such as interface 650.

The drives and their associated computer storage media discussed above and illustrated in FIG. 6 provide storage of computer-readable instructions, data structures, program modules, and other data for computer 600. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 600 through input devices such as a keyboard 662 and pointing device 661, commonly referred to as a mouse, trackball, or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port, or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer may operate in a networked environment using logical connections to one or more remote computers, such as a remote computer 680. The remote computer 680 may be a personal computer, a server, a router, a network PC, a peer device or other common network node, and typically includes many or all of the elements described above relative to computer 600, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets, and the Internet.

When used in a LAN networking environment, the computer 600 is connected to the LAN 671 through a network interface or adapter 670. When used in a WAN networking environment, the computer 600 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 600, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Conclusion

The systems and methods as described thus provide a way to ensure that a graphical user interface created to run on a display of one size will execute appropriately on other displays of various sizes. An application developer can thus be assured that the same version of an application will look similar even if used with displays of different dimensions. At the same time, OEMs are free to vary the look and feel of an application to suit their needs.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method of adapting graphic output of generic applications to an original equipment manufacturer (OEM) hardware display, comprising:

establishing a tiered sizing schema that defines multiple size tiers for display objects to be displayed on different OEM hardware displays;

establishing readability constraints for sizes of text objects to be displayed on the different OEM hardware displays;

specifying a minimum number of character spaces to be maintained in a text box associated with an individual text object;

embedding the tiered sizing schema the readability constraints and the minimum number of character spaces in an OEM software that receives the graphic output from the generic application;

receiving display object instances, text object instances, and a placement of the display object instances and the text object instances from a generic application;

adapting sizes of the display object instances via the OEM software according to the tiered sizing schema to fit a size of one of the OEM hardware displays; and adapting sizes of the text object instances via the OEM software according to the readability constraints to fit a size of the OEM hardware display while maintaining the minimum number of character spaces in the text box.

2. The method as recited in claim 1, further comprising providing one or more interfaces that enable visual aspects of the display object instances to be externally defined prior to the adapting sizes of the display object instances and prior to the adapting the placement.

3. A tiered sizing schema for adapting output of generic applications to an OEM hardware display, comprising:

a first definition for a size of a first-sized display object, the first-sized display object being defined according to first tiered fractions of a height and a width of a display;

a second definition for a size of a second-sized display object, the second-sized display object being defined according to second tiered fractions of the height and width of the display;

wherein display objects received from an application programs are adapted such that the display objects are resized for compatibility with an original equipment manufacturer (OEM) hardware display via OEM software implementing the tiered sizing schema including resizing for compatibility with an aspect ratio of a the hardware display, the display objects being resized according to the first definition and the second definition, and further in an instance where an individual display object is a text object, maintaining a pre-established minimum number of text characters for the text object.

4. The tiered sizing schema as recited in claim 3, wherein the fraction of a height and a width of a display further comprises a tiered percentage of the height of the display measured from a top edge of the display, and a percentage of the width of the display measured from a left edge of the display, respectively.

5. One or more computer-readable media containing computer-executable instructions that, when executed on a computer, perform the following steps:
- defining multiple upper left bounds of a display object to be displayed on a display according to a tiered fraction of a height of the display and a tiered fraction of a width of the display;
- defining multiple lower right bounds of the display object according to a tiered fraction of the height and the width of the display;
- defining multiple sizes for the display object according to a tiered sizing schema for display object sizes;
- receiving a GUI configuration from an application program, wherein the GUI configuration specifies the display object, an upper left bound, a lower right bound, and a size of the display object;
- adapting the upper left bound, the lower right bound, and the size to an original equipment manufacturer (OEM) hardware display via OEM software implementing the tiered sizing schema including resizing for compatibility with an aspect ratio of a the hardware display, the display objects being resized to an aspect ratio of the hardware display by selecting one of the defined multiple upper left bounds, one of the defined lower right bounds, and one of the defined sizes, while in an instance where the display object is a text object, maintaining a pre-established number of character spaces for the text object.

6. The one or more computer-readable media as recited in claim 5, wherein the fraction of the height of the display further comprises a tiered percentage of the height of the display from a top edge of the display.

7. The one or more computer-readable media as recited in claim 5, wherein the tiered fraction of the width of the display further comprises a percentage of the width of the display from a left edge of the display.

8. The one or more computer-readable media as recited in claim 5, further comprising one or more interfaces that enable visual aspects of the display object to be externally defined prior to the adapting.

9. The one or more computer-readable media as recited in claim 5, further comprising rendering the display object on the display.

10. A system, comprising:
- a display rendering module to receive a configuration for a graphical user interface (GUI) from an application program and to adapt the configuration for a display hardware; and
- a display hardware to display the GUI;
  - wherein the GUI configuration includes display objects, and in instances where the display objects are text objects, a number of character spaces that are to be maintained for an individual text object, and wherein the GUI is potentially usable on different display hardwares having different height, width, resolution, and operating system platform characteristics;
  - wherein the display rendering module defines a tiered sizing schema for the display objects in the graphical user interface;
  - wherein the display rendering module selects tiered sizes for the display objects in order to transform the GUI configuration from the application program into a modified GUI configuration suitable for an aspect ratio of the display hardware.

11. The system as recited in claim 10, wherein:
- the application program also defines display objects according to the tiered sizing schema;
- the visual aspects of the graphical user interface conform to the tiered sizing schema; and
- the tiered sizing schema defines one or more display object sizes to which the display objects contained in the graphical user interface must conform.

12. The system as recited in claim 10, wherein the tiered sizing schema further comprises definitions for a small-sized display object, a medium-sized display object and a large-sized display object.

13. The system as recited in claim 10, wherein the tiered sizing schema defines the sizes according to a tiered fraction of the height and width of the display.

14. The system as recited in claim 10, wherein the tiered sizing schema defines the sizes according to a tiered percentage of the display that each display object may occupy.

* * * * *